V. ERNSBERGER.
GAS STERILIZER AND PURIFIER.
APPLICATION FILED MAY 1, 1909.
949,032.
Patented Feb. 15, 1910.
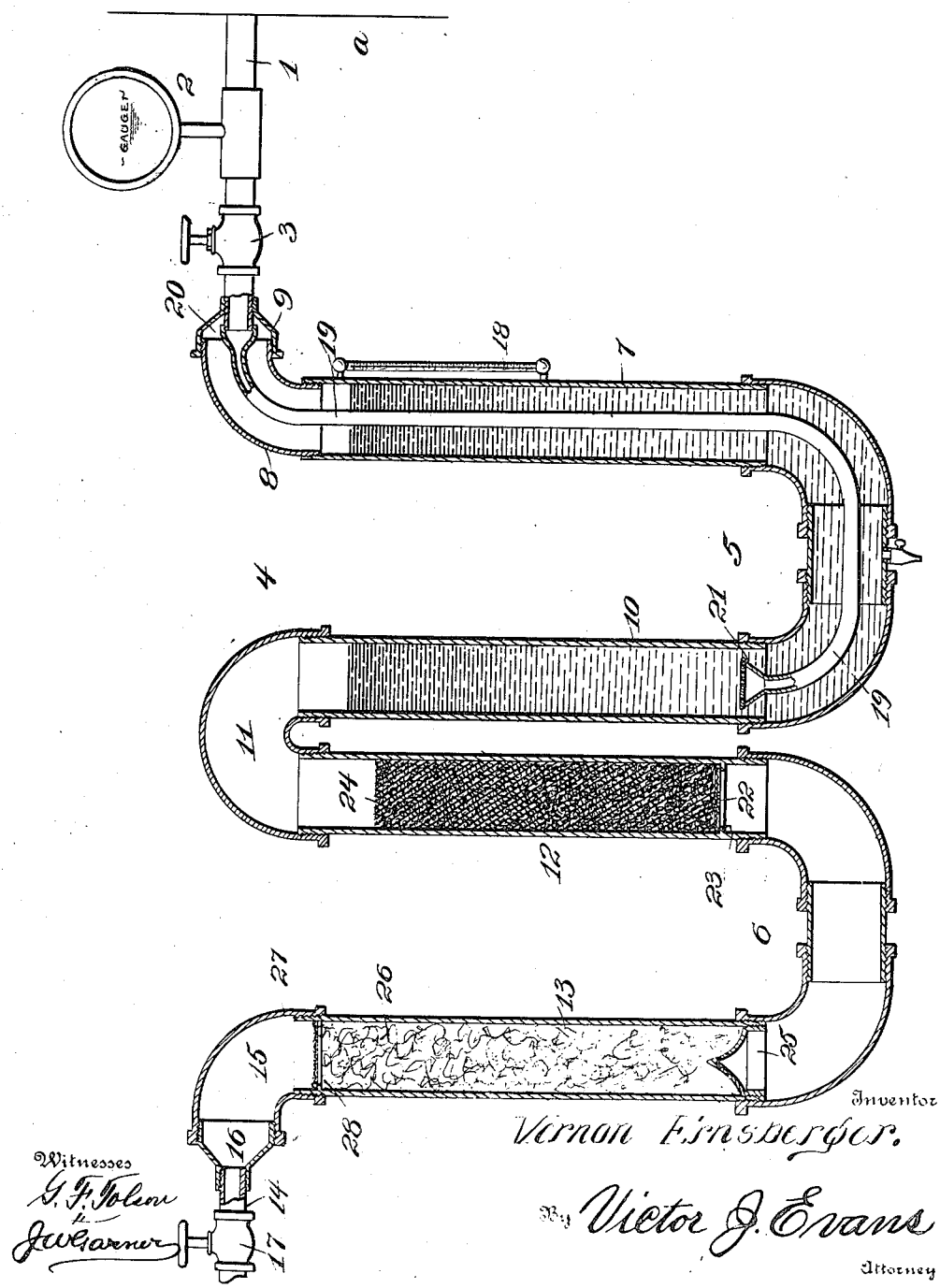
Witnesses
G. F. Tolson
J. W. Garner
Inventor
Vernon Ernsberger.
By Victor J. Evans
Attorney

UNITED STATES PATENT OFFICE.

VERNON ERNSBERGER, OF FREMONT, OHIO.

GAS STERILIZER AND PURIFIER.

949,032.  Specification of Letters Patent.  Patented Feb. 15, 1910.

Application filed May 1, 1909. Serial No. 493,331.

*To all whom it may concern:*

Be it known that I, VERNON ERNSBERGER, a citizen of the United States, residing at Fremont, in the county of Sandusky and State of Ohio, have invented new and useful Improvements in Gas Sterilizers and Purifiers, of which the following is a specification.

This invention is an improved gas sterilizer and purifier particularly adapted for use in connection with catacombs, vaults or the like for purifying and sterilizing the gases vented from the hermetically sealed compartments in which the bodies of the dead are placed and the said invention consists in the construction, combination and arrangement of devices hereinafter described and claimed.

The accompanying drawing is partly a sectional view and partly an elevation of a gas purifying and sterilizing apparatus constructed in accordance with this invention.

In the embodiment of the invention here shown, a pipe 1 is provided for attachment to and communication with the vault or the like structure indicated at *a* to afford a vent for the gases and the said pipe is preferably provided with a suitable pressure gage 2 and a cut-off valve 3. To the said pipe is connected one end of a gas purifying and sterilizing duct 4 which within the scope of the invention may be of any suitable construction and is provided with a pair of traps 5, 6, said traps being here shown as U-shaped. The arm 7 of the trap 5 is connected to the gas venting pipe 1 by the elbow 8 and reducer cap 9. The arm 10 of said trap 5 is connected by an elbow 11 to the arm 12 of the trap 6 and the arm 13 of said trap 6 is connected to a gas discharge pipe 14 by an elbow 15 and a reducer cap 16, said discharge pipe being preferably provided with a valve 17 whereby it may be opened or closed. The parts of the said duct are here shown as detachable and screwed together. The said duct with its traps may be constructed of any suitable material and its parts may be secured together by any suitable means. I do not desire to limit myself in these particulars.

The trap 5 is, in use, nearly filled with a suitable liquid germicide, and preferably one of the arms of the germicide trap is provided with a gage 18 whereby the quantity of germicide therein may be noted. A gas conducting pipe 19 which is preferably of reduced diameter as compared with the venting pipe 1 and is of very much less diameter than the arms of the germicide trap has one end connected to the discharge portion of the venting pipe 1, within the reducer cap 9 as at 20. The said gas conducting pipe is disposed in the germicide trap, extends downward through the arm 7 thereof, through the lower portion of the said trap and its discharge end is provided with a rose 21, which rose presents a perforated diaphragm of larger diameter than the said gas conducting pipe 19 and is disposed in the lower portion of the arm 10 of the germicide trap where it is submerged in the column of liquid germicide in said arm of the trap, so that the gases which pass through the said gas conducting pipe 19 escape upwardly from the upturned discharge end of said pipe are diffused by the rose and are caused to bubble up through the column of liquid germicide in the arm 10 of the germicide trap and hence such gases are thoroughly sterilized by such germicide. It will be understood that the gas pressure in the gas conducting pipe 19 prevents the liquid germicide from entering the said pipe.

Near the lower portion of the arm 12 or intake arm of the purifying trap 6 is a foraminous diaphragm 22 which is here shown as supported on an annular shoulder 23 in said arm. The said foraminous diaphragm supports a quantity of dry pulverized charcoal or other suitable gas purifying material, indicated at 24. Screwed in the lower end of the arm 13 of the purifying trap is a conical perforated bottom piece 25 which supports a quantity of cotton or other suitable fibers or other particle arresting or absorbent material 26. A retaining foraminous cover 27 in the upper portion of said arm 13 and here shown as bearing on an annular shoulder 28 in the said arm 13, is also provided.

The gases which result from decomposition are caused, either by their own expansive force or by the action of a suitable pump bodies lie and the pipe 19 through and are to pass from the compartments in which the sterilized in and by the body of liquid germicide in the germicide trap as hereinbefore described. They then pass downwardly through the body of pulverized charcoal or other purifying agent in the arm 12 of the purifying trap and from said arm pass upwardly through the body of particle arresting and absorbent material 26 through the arm 13 of said purifying trap, and finally through the pipe 14 into the outer air. Hence the said gases are sterilized, purified and rendered entirely innocuous.

What is claimed is:—

1. The herein described gas purifier and sterilizer comprising a duct formed of a plurality of connected U-shaped traps, one of said traps forming a chamber for the reception of the liquid germicide and the other having the arms thereof provided with foraminous diaphragms and respectively containing the gas purifying material and an absorbent material, a vent pipe connected to the intake arm of the liquid germicide trap and a gas conducting pipe connected to said vent pipe and located in said liquid germicide trap and discharging therein at a lower point to cause gas to ascend from said discharge through the germicide in said trap.

2. In apparatus of the class described, a vent pipe, a reducer cap thereon, a U-shaped trap duct of greater diameter than the vent pipe and having one of its arms connected at the upper end to the reducer cap, and a gas conducting pipe, of less diameter than and located in said trap, said pipe being connected to the vent pipe at a distance within the reducer cap and having a discharge located in the lower portion of the trap duct.

In testimony whereof I affix my signature in presence of two witnesses.

VERNON ERNSBERGER.

Witnesses:
A. E. CULBERT,
JOSEPH BINSACK.